United States Patent
Momchilov et al.

(10) Patent No.: US 12,034,845 B2
(45) Date of Patent: Jul. 9, 2024

(54) SMART CARD AND ASSOCIATED METHODS FOR INITIATING VIRTUAL SESSIONS AT KIOSK DEVICE

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US)

(73) Assignee: Citrix Systems, Inc., Fort Lauderdale, NJ (US)

( * ) Notice: Subject to any disclaimer, the term of this patent is extended or adjusted under 35 U.S.C. 154(b) by 331 days.

(21) Appl. No.: 17/447,713

(22) Filed: Sep. 15, 2021

(65) Prior Publication Data
US 2022/0173890 A1 Jun. 2, 2022

Related U.S. Application Data

(60) Provisional application No. 63/119,079, filed on Nov. 30, 2020.

(51) Int. Cl.
*H04L 9/08* (2006.01)
*G06F 12/0802* (2016.01)
(Continued)

(52) U.S. Cl.
CPC .......... *H04L 9/088* (2013.01); *G06F 12/0802* (2013.01); *G06K 19/0723* (2013.01); *H04L 63/0815* (2013.01); *H04L 67/141* (2013.01); *H04L 67/568* (2022.05); *G06F 2212/60* (2013.01)

(58) Field of Classification Search
None
See application file for complete search history.

(56) References Cited

U.S. PATENT DOCUMENTS 7,997,482 B2 * 8/2011 Kannan .................. G06F 21/34
235/487
8,014,421 B2 9/2011 Rao et al.
(Continued)

FOREIGN PATENT DOCUMENTS

| WO | WO2006121854 A1 | 1/2008 |
| WO | WO2018234886 A1 | 12/2018 |
| WO | WO2020118161 | 6/2020 |

OTHER PUBLICATIONS

U.S. Appl. No. 16/992,393, filed Aug. 13, 2020, Momchilov et al.

*Primary Examiner* — Brandon Hoffman

(57) ABSTRACT

A smart card may include a memory configured to store a user connection lease and user interface (UI) cache for a user and a private/public key pair of the smart card, with the user connection lease being bound to the private/public key pair of the smart card. The smart card may further include a processor coupled to the memory and configured to establish a communications link with a kiosk device to be shared by a plurality of different users, initiate a virtual session for the user at the kiosk device based upon the user connection lease and the private key responsive to establishing the communications link (with the smart card defining an endpoint for the virtual session authorization), and cause the kiosk device to launch the virtual session based upon the user UI cache.

20 Claims, 16 Drawing Sheets

(51) Int. Cl.
  *G06K 19/07* (2006.01)
  *H04L 9/40* (2022.01)
  *H04L 67/141* (2022.01)
  *H04L 67/568* (2022.01)

(56) References Cited

U.S. PATENT DOCUMENTS

| | | |
|---|---|---|
| 8,132,247 B2 | 3/2012 | Adhya et al. |
| 8,990,898 B2 | 3/2015 | Bell |
| 9,009,327 B2 | 4/2015 | Adhya et al. |
| 9,154,328 B2 | 10/2015 | Suganthi et al. |
| 9,286,281 B2 | 3/2016 | Dunn et al. |
| 9,313,203 B2 | 4/2016 | Adler |
| 9,690,954 B2 | 6/2017 | Nord et al. |
| 9,800,669 B2 | 10/2017 | Bell |
| 9,805,210 B2 | 10/2017 | Nord et al. |
| 9,972,005 B2 | 5/2018 | Wong |
| 10,122,709 B2 | 11/2018 | Momchilov |
| 10,404,678 B2 | 9/2019 | Grajek |
| 10,715,327 B1 | 7/2020 | Ramanujan |
| 10,778,591 B2 | 9/2020 | Ramaiah et al. |
| 2004/0117574 A1* | 6/2004 | Massard ............ G06F 21/62 711/163 |
| 2007/0143832 A1 | 6/2007 | Perrella |
| 2009/0037729 A1 | 2/2009 | Smith |
| 2009/0132813 A1 | 5/2009 | Schibuk |
| 2011/0258452 A1 | 10/2011 | Coulier |
| 2011/0265159 A1 | 10/2011 | Ronda |
| 2012/0204245 A1 | 8/2012 | Ting |
| 2012/0233705 A1 | 9/2012 | Boysen |
| 2014/0115675 A1* | 4/2014 | Jung .................. H04L 67/10 726/9 |
| 2014/0189808 A1 | 7/2014 | Mahaffey |
| 2014/0189841 A1 | 7/2014 | Metke |
| 2014/0304514 A1 | 10/2014 | Greene |
| 2015/0180868 A1 | 6/2015 | Sng |
| 2015/0319174 A1 | 11/2015 | Hayton |
| 2015/0341340 A1 | 11/2015 | Lu |
| 2015/0381621 A1 | 12/2015 | Innes |
| 2016/0094543 A1 | 3/2016 | Innes et al. |
| 2016/0065568 A1 | 6/2016 | Dave |
| 2016/0191494 A1 | 6/2016 | Claes |
| 2017/0126661 A1 | 5/2017 | Brannon |
| 2017/0288937 A1 | 10/2017 | Zhang |
| 2018/0007059 A1* | 1/2018 | Innes ................ G06F 21/6218 |
| 2018/0137512 A1 | 5/2018 | Georgiadis |
| 2018/0165781 A1 | 6/2018 | Rodriguez |
| 2018/0183793 A1 | 6/2018 | Mandadi |
| 2018/0183802 A1 | 6/2018 | Choyi |
| 2018/0295120 A1 | 10/2018 | Dawson |
| 2019/0245848 A1 | 8/2019 | Divoux |
| 2019/0058700 A1 | 9/2019 | Kurian |
| 2019/0278616 A1 | 9/2019 | Momchilov |
| 2019/0018697 A1 | 10/2019 | Larsson |
| 2019/0372977 A1 | 12/2019 | Ben-David |
| 2020/0067904 A1 | 2/2020 | Hugot |
| 2020/0374121 A1* | 11/2020 | Momchilov .......... H04L 9/0825 |

\* cited by examiner

SMART CARD AND ASSOCIATED METHODS FOR INITIATING VIRTUAL SESSIONS AT KIOSK DEVICE

RELATED APPLICATIONS

This application claims the benefit of provisional application Ser. No. 63/119,079 filed Nov. 30, 2020, which are hereby incorporated herein in their entireties by reference.

BACKGROUND

Many organizations are now using applications to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. As an example, Virtual Desktop Infrastructure (VDI) refers to the process of running a user desktop inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A smart card may include a memory configured to store a user connection lease and user interface (UI) cache for a user and a private/public key pair of the smart card, with the user connection lease being bound to the private/public key pair of the smart card. The smart card may further include a processor coupled to the memory and configured to establish a communications link with a kiosk device to be shared by a plurality of different users, initiate a virtual session for the user at the kiosk device based upon the user connection lease and the private key responsive to establishing the communications link (with the smart card defining an endpoint for the virtual session authorization), and cause the shared kiosk device to launch the virtual session based upon the user UI cache.

In an example embodiment, updates to the user connection lease and UI cache may be stored at the kiosk device, and the processor may be configured to download the updates to the user connection lease and UI cache from the kiosk device to the memory upon establishing the communications link with the kiosk device. The memory may be further configured to store an authentication (auth) token, and the processor may be configured to initiate the virtual session using single sign-on (SSon) authentication based upon the auth token, for example.

In an example implementation, the memory may be configured to store a version of the public encryption key signed by a Root of Trust (RoT), and the processor may be further configured to cause the kiosk device to initiate updates to the user connection lease by a connection lease issuing service (CLIS) and to initiate the virtual session for the user at the kiosk device based upon the public encryption key signed by the RoT. More particularly, the memory may be further configured to store a public encryption key of the CLIS signed by the RoT and a public encryption key of the RoT, and the processor may be further configured to initiate the virtual session by performing a user connection lease exchange with a virtual delivery appliance configured to deliver the virtual session based upon the signed CLIS public key and the RoT public key.

By way of example, the UI cache may comprise at least one static asset to be displayed by the kiosk device. In accordance with another example, the UI cache may comprise at least one published resource the user is entitled to access through the virtual session. Also by way of example, the communications link may comprise at least one of a near field communication (NFC) link, a universal serial bus (USB) link, a Bluetooth link, and a wireless local area network (WLAN) link.

A related electronic device may include a portable housing, and a memory in the portable housing configured to store a virtual smart card, a private/public key pair of the virtual smart card, and a user connection lease and UI cache for a user. The user connection lease may be bound to the private/public key pair of the virtual smart card. The electronic device may further include a processor in the portable housing coupled to the memory and configured to establish a communications link with a kiosk device to be shared by a plurality of different users, initiate a virtual session for the user at the kiosk device based upon the user connection lease and the private key responsive to establishing the communications link (with the virtual smart card defining an endpoint for the virtual session authorization), and cause the shared kiosk device to launch the virtual session based upon the user UI cache.

A related method may include storing in a memory of a smart card a user connection lease and UI cache for a user and a private/public key pair of the smart card, with the user connection lease being bound to the private/public key pair of the smart card, and establishing a communications link between the smart card and a kiosk device, with the kiosk device to be shared by a plurality of different users. The method may also include initiating a virtual session for the user at the kiosk device using the smart card based upon the user connection lease and the private key responsive to establishing the communications link (with the smart card defining an endpoint for the virtual session authorization), and causing the shared kiosk device to launch the virtual session using the smart card based upon the user UI cache.

DETAILED DESCRIPTION

One approach to connecting user computing devices to virtual sessions is involves connection leases, which provide long-lived and mostly static entitlements to published resources the users are entitled to access. This not only makes the connection lease secure, it also allows the connection leases to be relatively long-lived in that they can be updated on a less frequent basis (e.g., to account for changes in user permissions, network addresses, etc.). While connection leases work well when authorizing virtual sessions to a specific user device, they become more challenging to implement when multiple users share a common device or kiosk to access virtual sessions. For example, doctors and nurses in a medical office may repeatedly go back and forth between shared computers in patient rooms, which would otherwise require user connection leases, security keys, etc., be synched to a kiosk each time a user logs on, which may cause significant delays. These problems may also occur at call centers or disaster recovery centers which also have shared computers.

The systems and methods described herein help overcome these technical problems through the use of secure smart cards which may be used to store user connection leases and user interface (UI) cache information, and serve as the endpoint for authorization of virtual sessions at the kiosk computing device. However, the kiosk computing device may store group connection lease and UI cache information common to the users in a delivery group which share the kiosk computing device, to help expedite session launching since this information does not have to be synched to the kiosk computing device for each new session. In this way, the shared kiosk computing device may still serve as the endpoint for the virtual computing sessions of multiple users, yet the smart cards may serve as the secure endpoint from which to quickly authenticate the virtual sessions.

Figure 1:
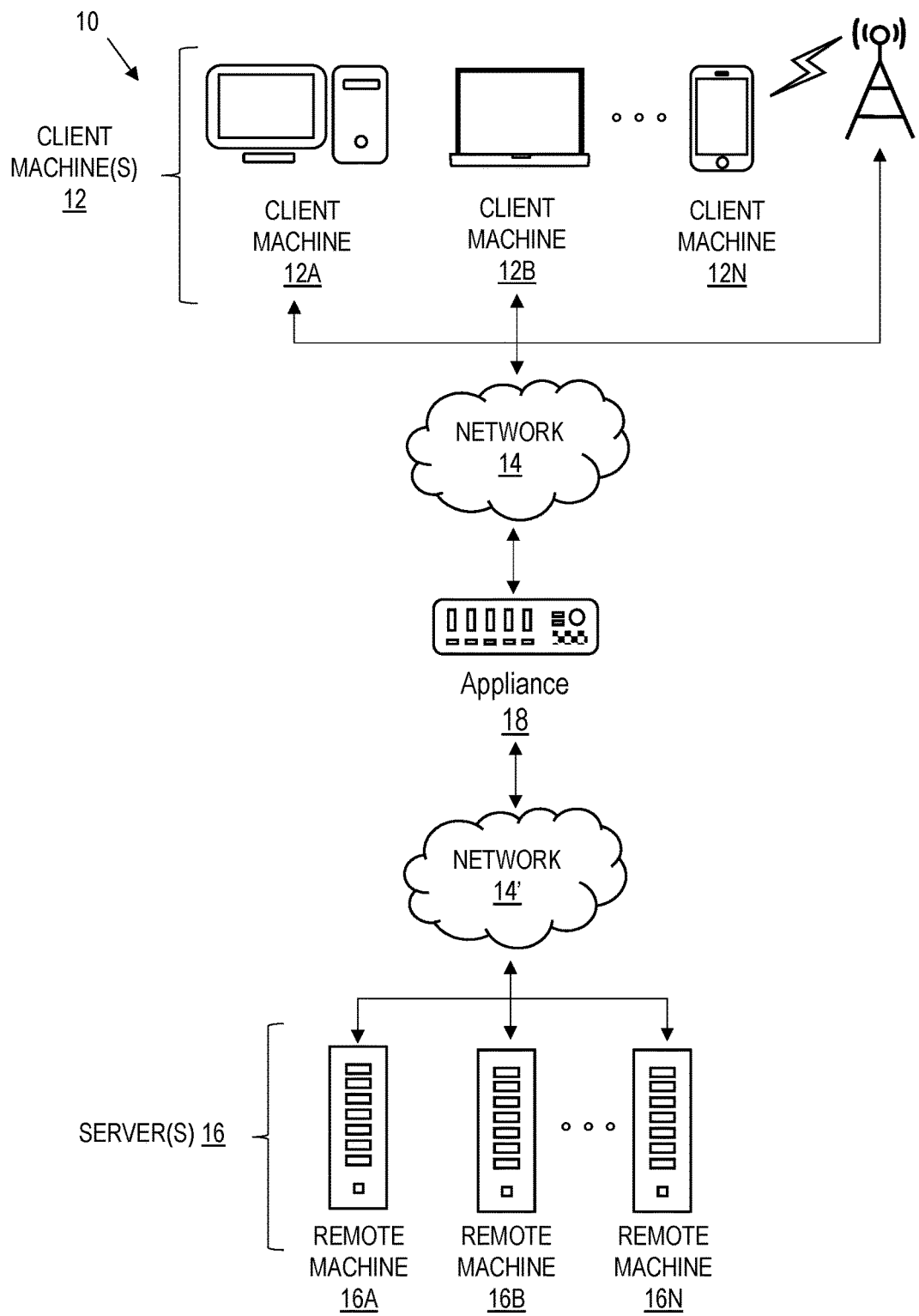
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
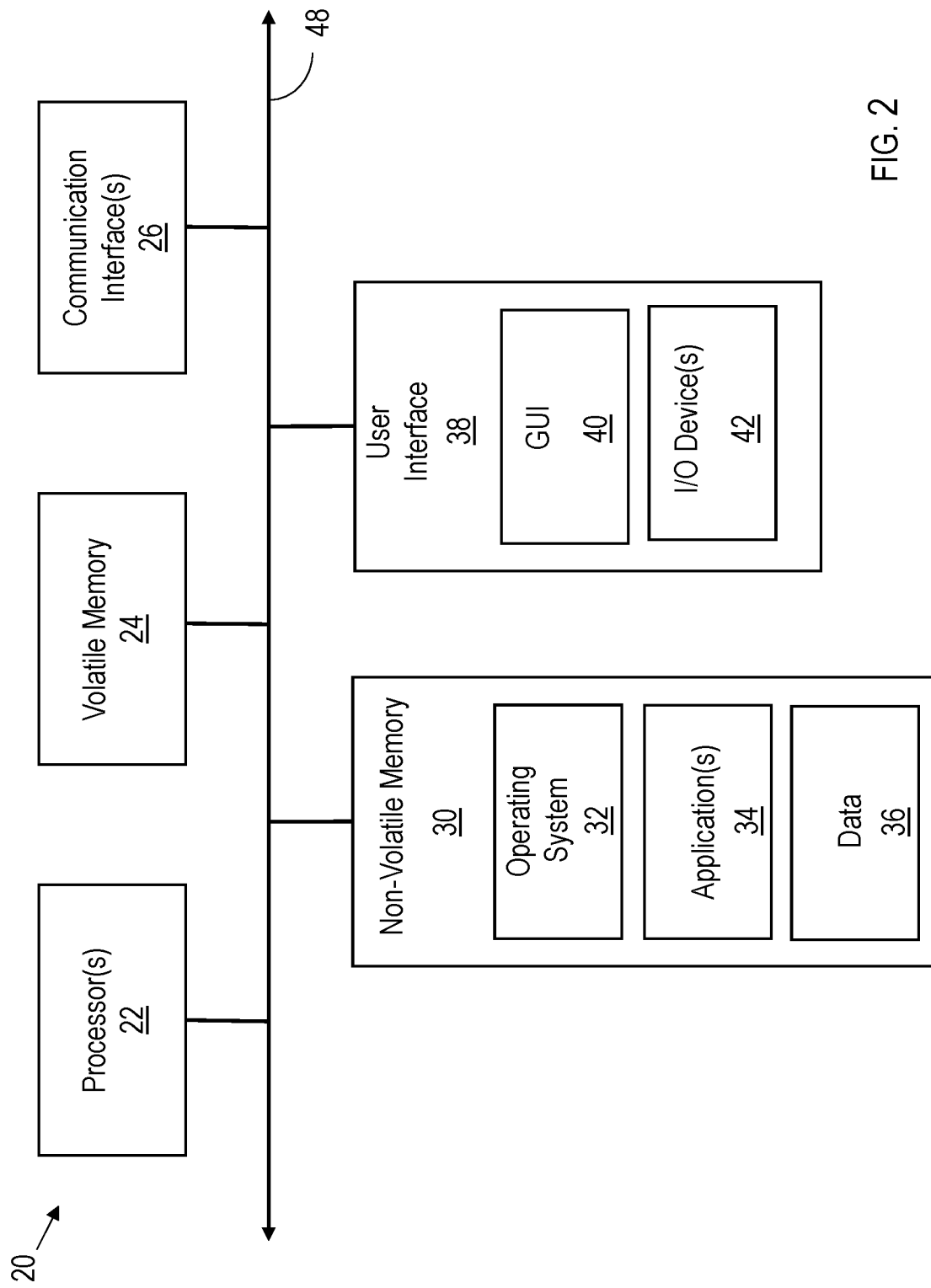
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
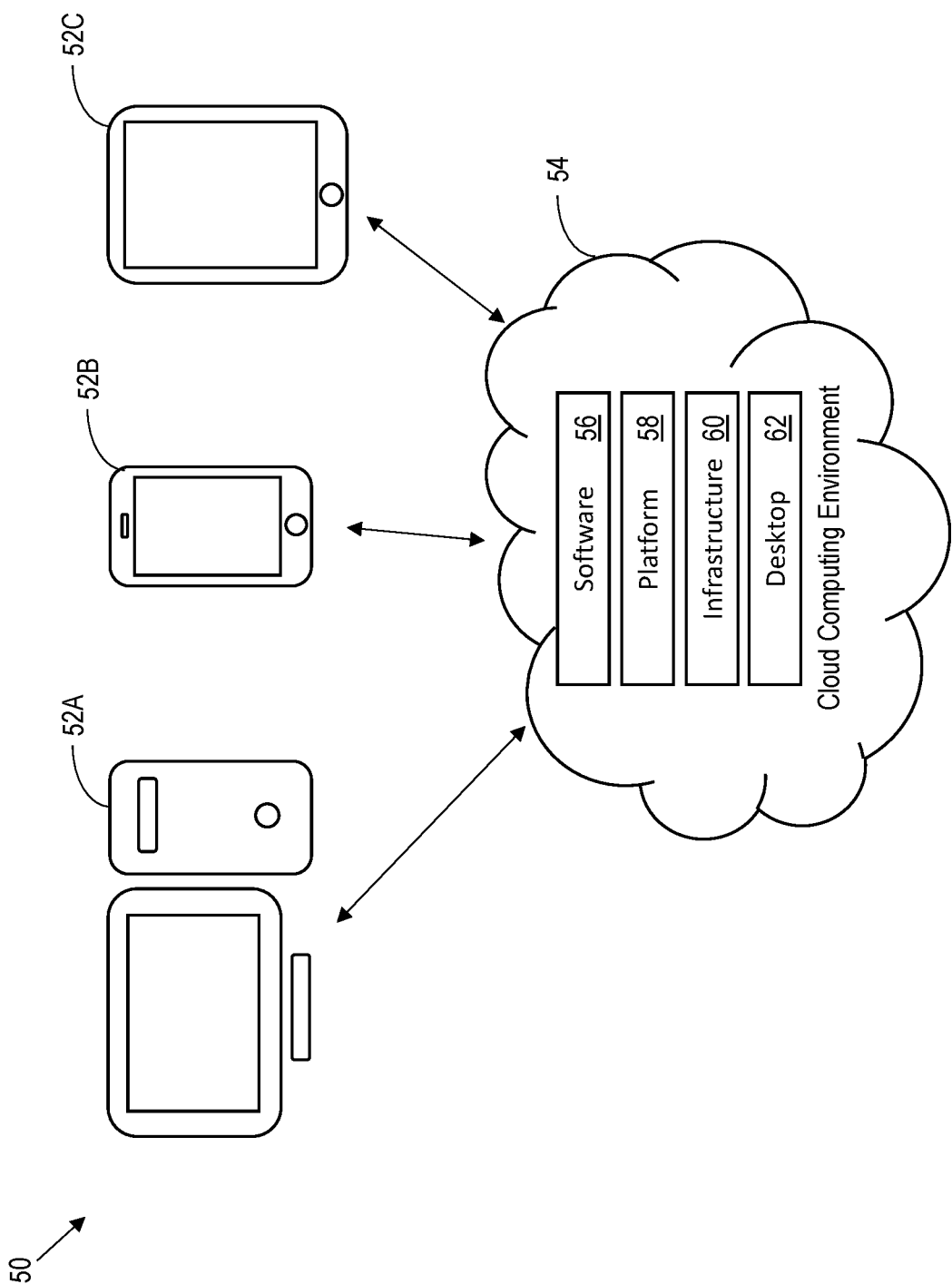
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
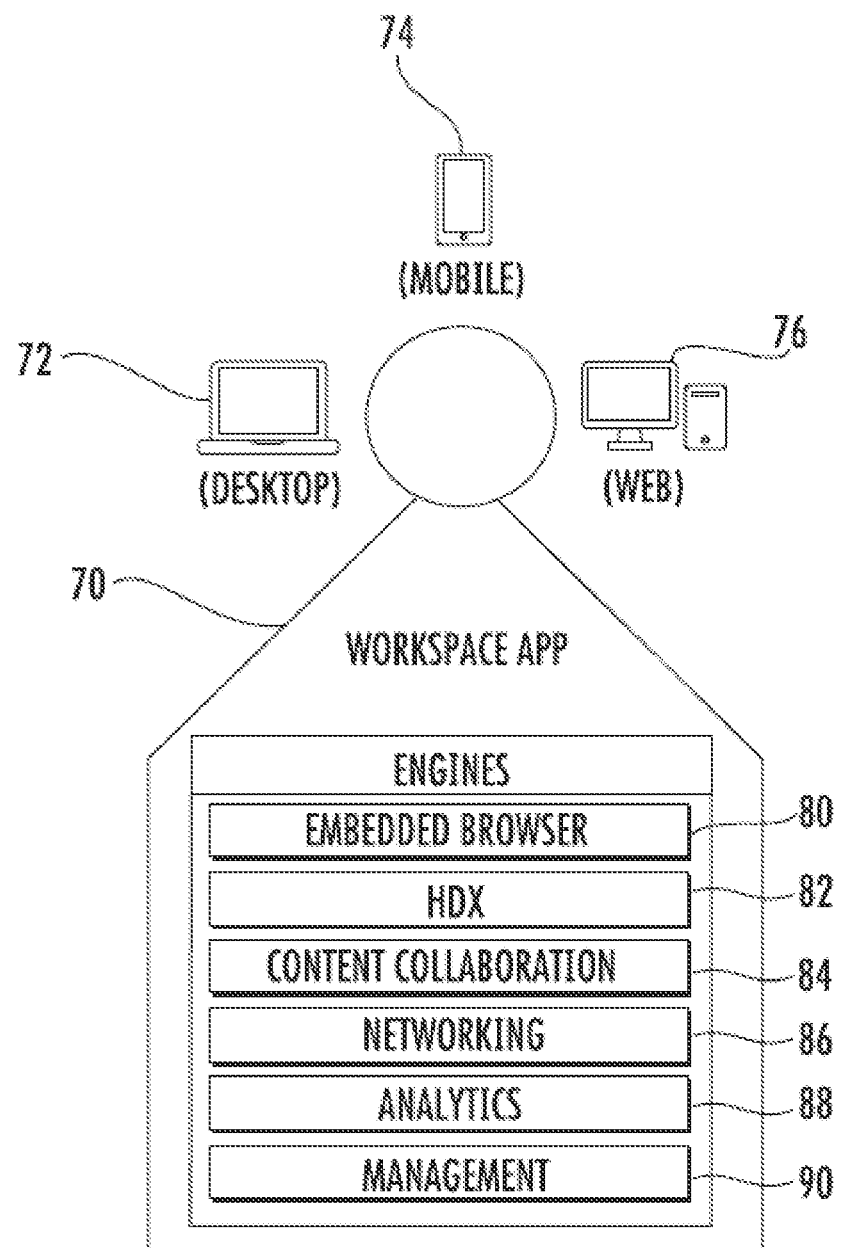
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
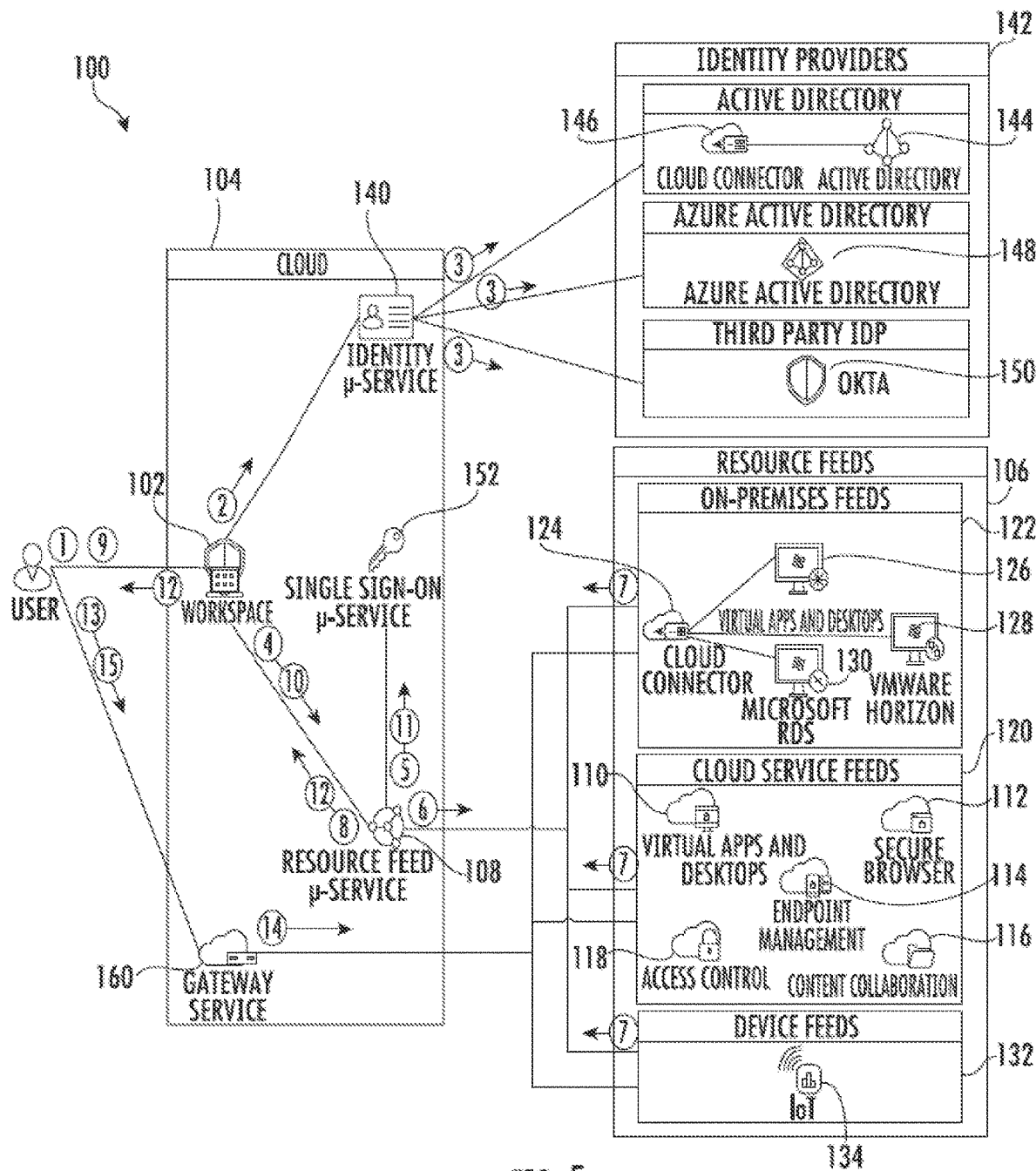
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
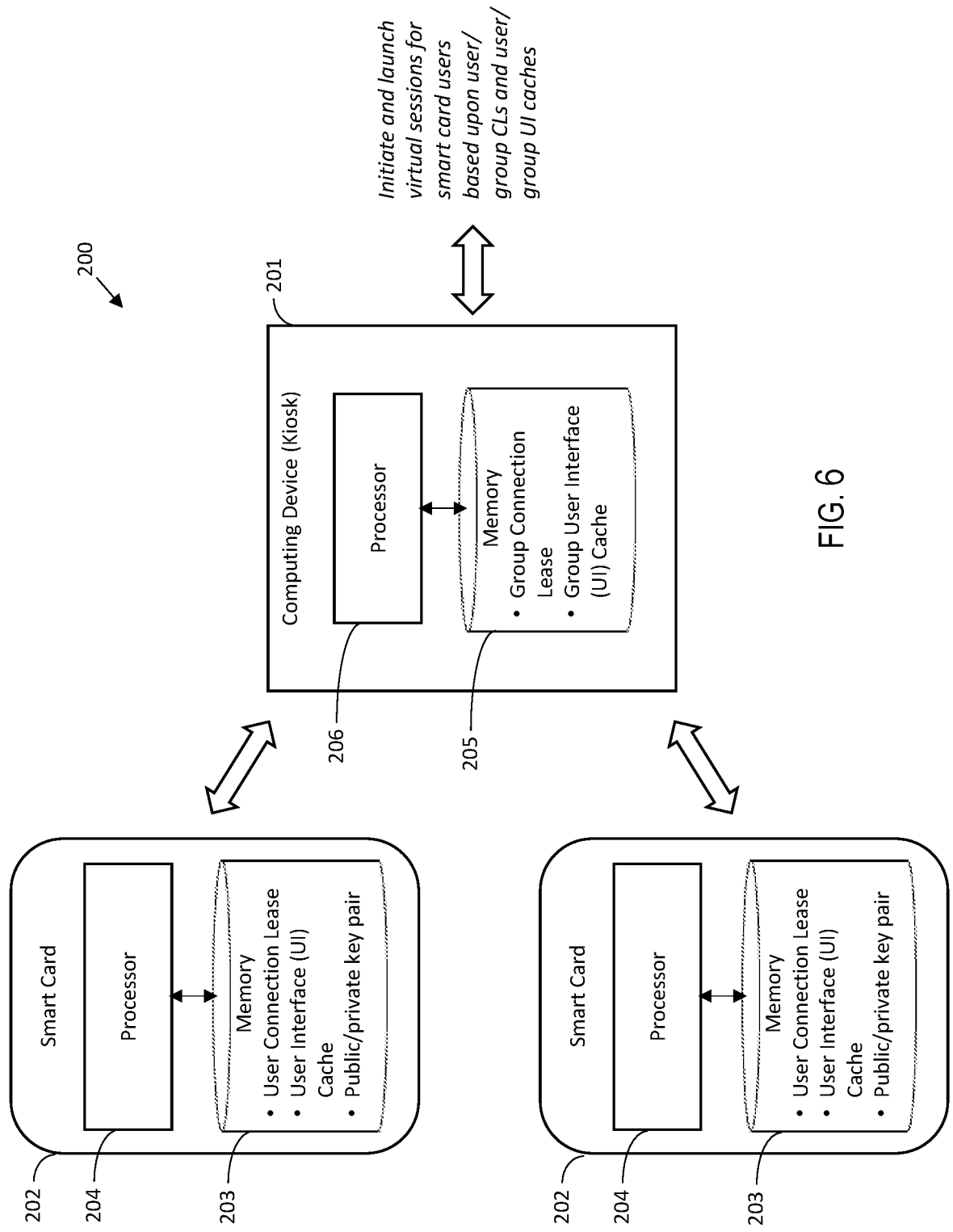
FIG. 6 is a schematic block diagram of a computing system providing virtual session access at a shared kiosk computing device using connection leases and smart cards.

Turning now to FIG. 6, a system 200 which provides secure access to virtual sessions for multiple users through a shared computing device 201 (e.g., kiosk) is first described. By way of background, two approaches are typically used to help ensure resiliency for users of a managed virtual computing infrastructure, such as the Workspace infrastructure described above. One of these approaches is the use of connection leases (CLs), which provide long-lived and mostly static entitlements to published resources. The other approach is Progressive Web App (PWA) service worker caching, which allows for web-based user interfaces (UIs) (such as the Workspace UI) to be functional even in offline or degraded network conditions.

However, in current implementations, both CLs and PWA-cached resources are user and device specific by design. Their lifetime is aligned with a user logging in/logging out on a specific device. Furthermore, CLs are encrypted and signed to prevent exfiltration and misuse by another user on another device. Similarly, a UI resource cache which includes different elements to be incorporated in specific UIs is protected for sensitive assets. This poses particular challenges in kiosk (shared device) use cases.

For example, in the healthcare vertical, doctors and nurses may roam between different locations and devices all day, e.g., offices, carts, patient rooms, mobile devices, etc. Using user-device specific CLs and resource caches will not work in many of these instances. The traditional CL approach typically works best in a mid-day (real-time) type of cloud outage where CLs and UI resource cache have already been synced and stored on the kiosk by an active user. However, the traditional approach fails in cases of an early morning outage where a new user attempts to use a random terminal. Similarly, it also fails in a scenario where a user decides to switch terminals. This is because users normally log out after each kiosk usage, and any user could use any random terminal. As a result, the CLs and UI resource cache would need to once again be synced and stored on the next kiosk. By way of contrast, the traditional approach works well in the non-kiosk scenarios when a user consistently uses his or her own devices, as the CLs and UI resource cache do not have to be re-synched as often.

In some scenarios such as healthcare, doctors and nurses usually are entitled to the same apps/desktops. A possible approach to sharing CLs in a kiosk mode is for a Connection Lease Issuing Service (CLIS) (which will be discussed further below) to generate group-level CLs, e.g., for specific delivery groups. Then any user can request and sync the group-level CL to an endpoint device. Assuming some physical security, group-level CLs will not be cleared upon log out, so subsequently any other user can consume the group-level CLs. A group-level CL could be a resource CL, e.g., pointing to an app/desktop, or any component CL, e.g. for common parameters, resource locations, etc. For security reasons, after launching with a group-level CL, users may still have to authenticate to the session (e.g., a Citrix VDA HDX session) with their identity. A similar approach of using group-level UI resource cache can also be applied.

This approach may work sufficiently for the kiosk scenarios described above, but may be deficient in others. For example, some financial institutions have a large number of thin client terminals that are stateless and refresh very often, e.g., with every reboot. Devices may be rebooted on a schedule, after a software update, or by a user. In addition, users may be assigned to hundreds of different delivery groups, e.g., with different app/desktop assignments, resource locations, etc., and the groups themselves may change very often, e.g., on a weekly basis. Furthermore, users may end up using a different random terminal each day.

In yet another scenario, a customer may have a physical disaster recovery site with terminals that are used only in extreme circumstances, such as during a natural disaster or pandemic, requiring a select group of people to work together, while others work from home, etc. In a disaster recovery site, apart from a managed application (e.g., CWA) installed at the kiosks, terminals will be a clean slate. In still another scenario, a user that just obtained a brand-new device may unfortunately experience an offline or Cloud outage condition while trying to set it up, in which case no CLs or resource cache could be freshly generated for the device.

In addition, as a security deficiency, a physical Trusted Platform Module (TPM) may not be present on a kiosk, or a TPM may exist but may not be configured for use by the managed application. A potential vulnerability involves stealing the device private/public key pair along with CLs and authentication (or auth) tokens normally bound to a computing device, and then using them from another device. More particularly, a public/private key pair is created on the endpoint device (in this case the kiosk machine). CLs and Authentication Tokens (which are long lived) are bound to the device because they contain a hash of the endpoint public key and are signed by a trusted cloud component (e.g., CLIS for leases). This is what prevents stealing of the CLs (and Authentication Tokens) and using them from another device. In this regard, a mutual trust protocol may be used in which the peer "challenges" the device to prove that it owns the private key corresponding to the public key referenced in a CL or Authentication Token. The highest security for a private key is provided by using hardware storage—which also includes the capability of generating public/private key pairs (therefore, a private key never leaves the hardware). Examples of hardware storage include a Hardware Security Module (HSM), TPM, and smart cards.

Typically on a kiosk machine there will be a TPM on the motherboard. However, some kiosk machines might be relatively low cost, thin clients for which no TPM is available, increasing the risk that the private key can be exported (because it would be created via software and stored via OS APIs). Alternatively, the TPM might not be configured and therefore cannot be used by CWA. The present approach addresses this problem because the user "brings" the public/private key pair to the kiosk via his or her smart card (along with the CLs if they are on the card).

Similarly, there may be potential security issues with respect to HTML5 where the persistence of CLs and keys may be challenging. For an HTML5 version of an app running in a Web browser, for example, Web browsers have restrictions with respect to accessing native resources in that they typically run in a sandbox with limited or no access to the device file system. As such, it may be difficult to create a persistent public/private key pair from the HTML5 version of the app. Similarly, it is also difficult to store the CLs. However, the present approach addresses these technical problems because it allows the Web browser to access the wallet and retrieve/store/use the required information from a smart card.

To overcome the above-described challenges, the system 200 utilizes a plurality of smart cards (also referred to as "wallets" herein) 202 that illustratively include a memory 203 configured to store a user CL and user interface (UI) cache for a specific user, as well as a unique private/public key pair of the smart card. More particularly, the user CL is bound to the private/public key pair of the given smart card 202, in that the user connection lease is generated based upon the public key of the smart card. For example, the user CL may be bound in that a signed version of the public key (e.g., signed by a CLIS, as will be discussed further below)

may be embedded within the CL so that only the given smart card (which has the matching private key) can validate a challenge resulting from an attempt to use the connection lease.

Furthermore, the kiosk computing device 201 also illustratively includes a memory 205 configured to store a group CL and a group UI cache shared by different users within a user delivery group (e.g., employees in a doctor's office, corporate office, etc.). The computing device 201 also illustratively includes a processor 206 coupled to the memory 205. Furthermore, each smart card 202 also illustratively includes a processor 204 coupled to its memory 203, and the processor is configured to establish a communications link with the processor 206 of the kiosk computing device 201, as will be discussed further below. As noted above, the kiosk computing device 201 is to be shared by the different users of the smart cards 202. Responsive to establishing the communications links, the kiosk computing device 201 initiates virtual sessions (e.g., virtual apps/desktops, SaaS apps, DaaS, etc.) for users at the kiosk computing device 202 based upon the particular user connection lease and the private key of the given smart card 202, as well as the group connection lease for the particular user group. As will also be discussed further below, the smart cards 202 define an endpoint for the virtual session authorization, whereas the kiosk computing device 201 is the endpoint for the virtual session itself. Upon authentication of the connection leases, the kiosk computing device 201 may then launch the requested virtual session based upon the user and group UI caches.

Figure 7:
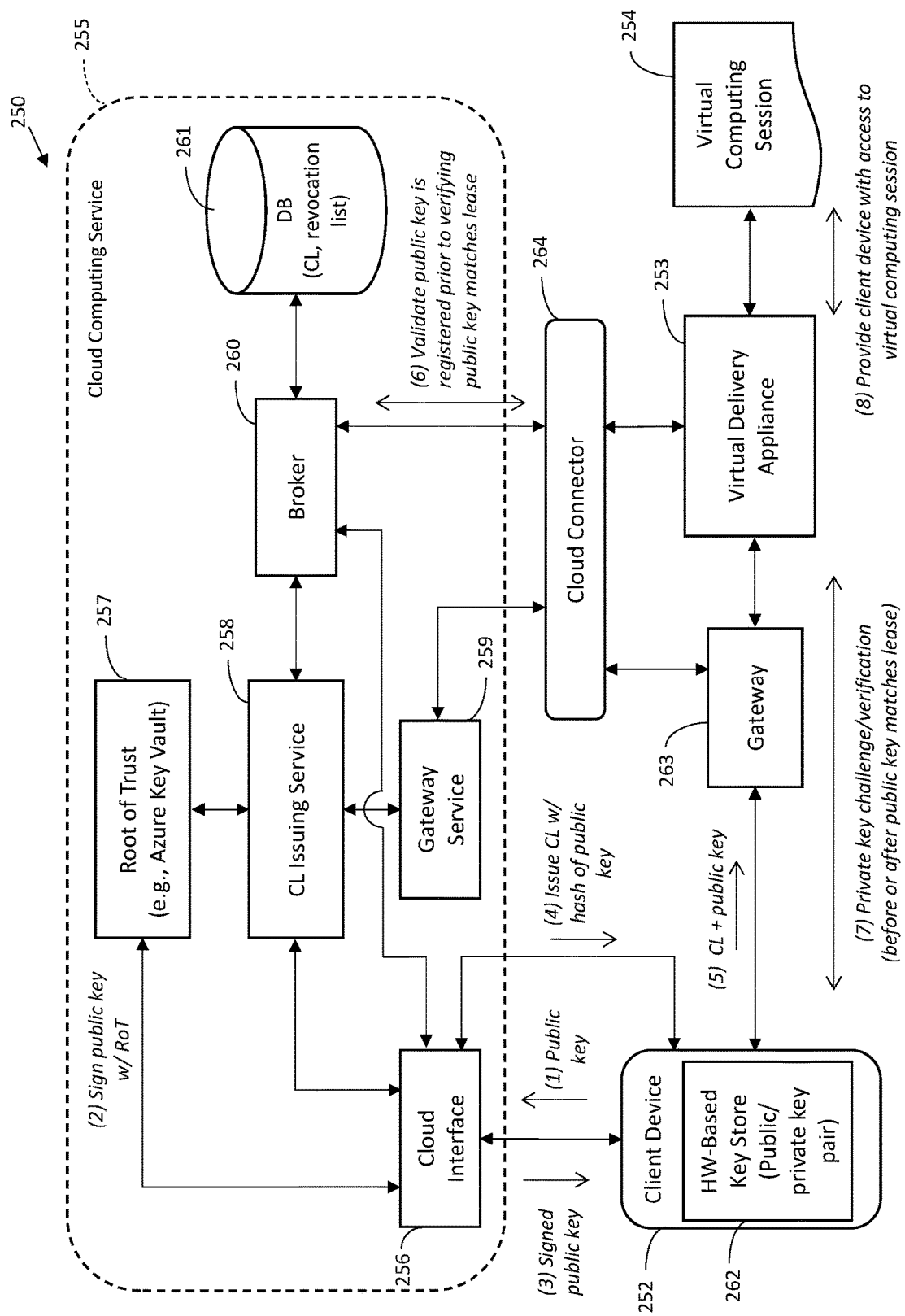
FIG. 7 is a schematic block diagram of a connection lease architecture and independent flow sequences in which the system of FIG. 6 may be implemented in accordance with an example embodiment.

The foregoing will now be further described in the context of an example implementation of a computing system 250 shown in FIG. 7. In the illustrated example, the above-described computing device 201 and lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace, and the client device 252 may be running Citrix Workspace App, although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases, in contrast to the legacy virtual delivery appliance 204 described above. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing. However, because the legacy virtual delivery appliances 204 described above with reference to FIG. 6 are not configured for such connection lease exchanges, these advantages would not otherwise be possible while using such legacy appliances.

Figure 8:
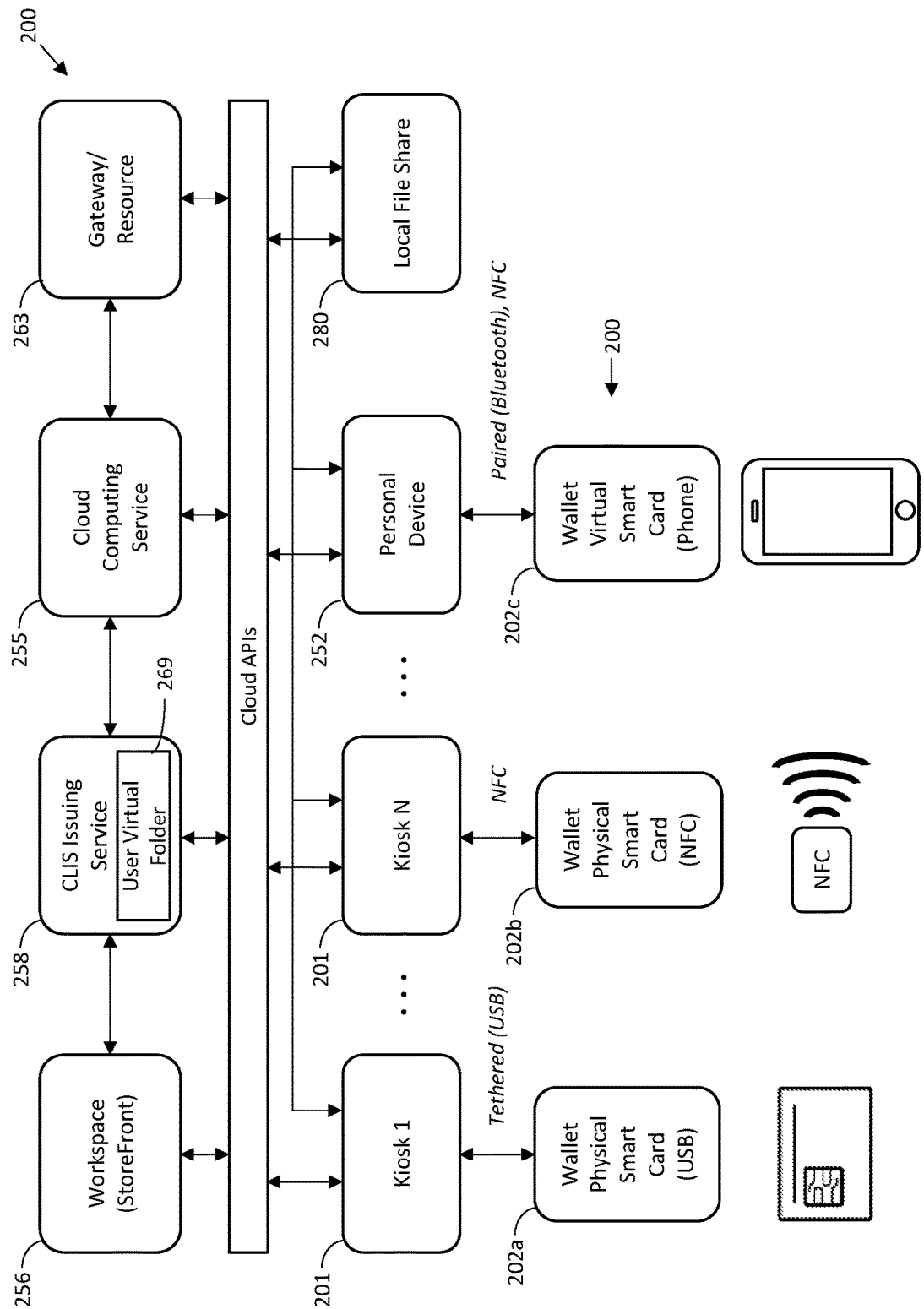
FIG. 8 is a schematic block diagram illustrating an example implementation of the system of FIG. 6
Figure 9:
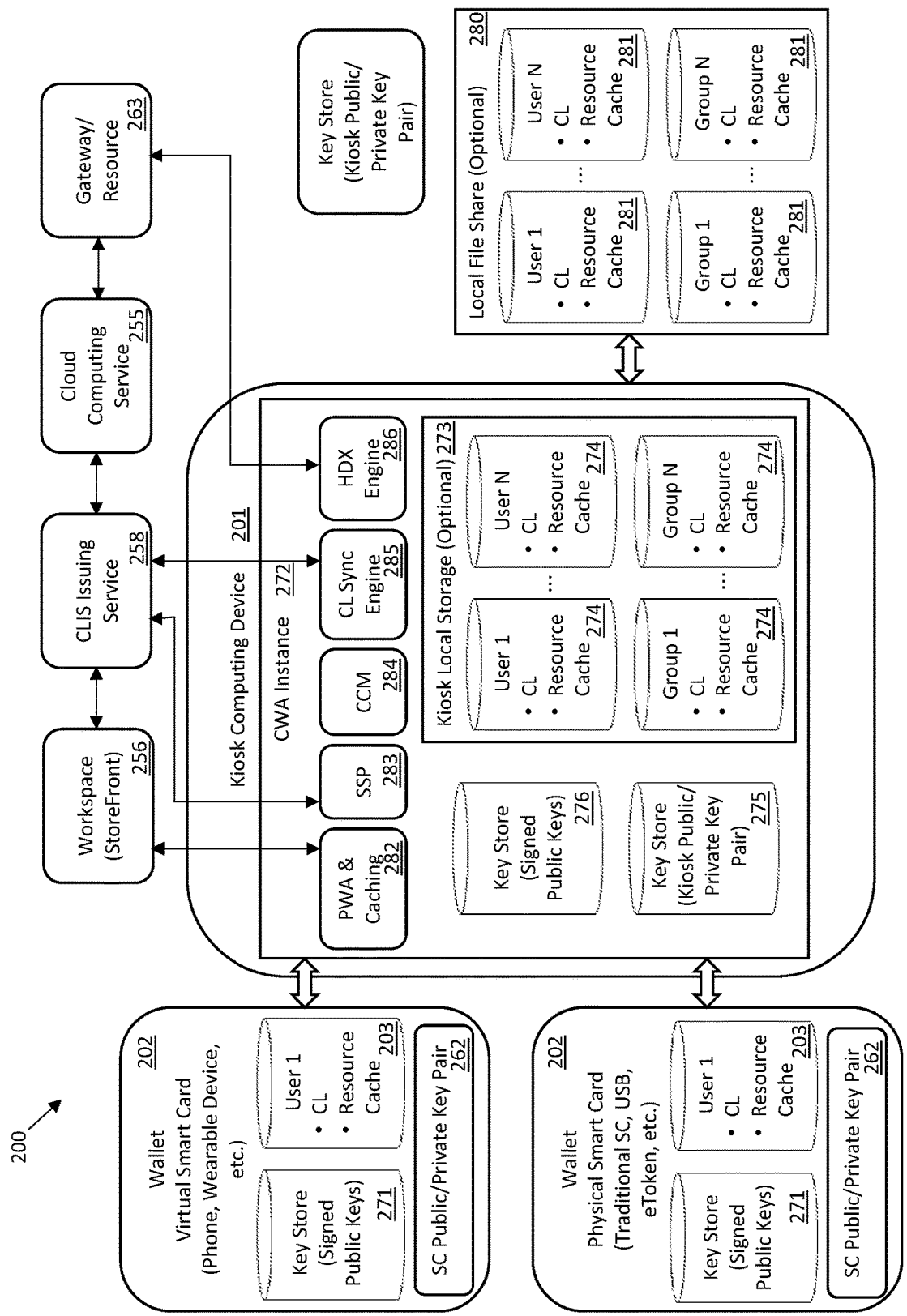
FIG. 9 is a schematic block diagram illustrating the system of FIG. 8 in greater detail.

Referring additionally to FIGS. 8 and 9, an example implementation of the system 200 using the connection lease architecture described above with reference to FIG. 7 is now described. In the illustrated example, CLs and endpoint private/public key pairs are stored in the key store 262 of either physical or virtual smart cards (SCs) 202, as well as signed public keys (e.g., signed gateway 263 and virtual delivery appliance 253 public keys signed by the RoT 257) in data stores 271. In the example of FIG. 8, two physical smart cards 202a and 202b are shown, one of which is a universal serial bus (USB) smart card and the other is a wireless Near Field Communication (NFC) smart card, although other physical smart card form factors may also be used in different embodiments. Moreover, a virtual smart card 202c is also shown which may be incorporated on a smartphone, smart watch, or other suitable mobile electronic (personal) device.

In addition to the above-noted data, enough other associated information may also be stored at the SCs 202 to treat the SCs 202 as the endpoint device when inserted in a reader attached to a kiosk computing device 201 with, in the present example, CWA (Workspace app) installed thereon (although other managed applications may be used in different embodiments). By way of example, the other associated information may include a device bearer token or device ID, etc. For example, the device bearer token may be used in front-end authentication and take the form {Device ID, Endpoint Pub Key}, and it is signed by the RoT 257. The user CLs are tied or bound to the SC, and user long-lived auth tokens (for front-end authentication, resource enumeration, CL request and sync, etc.) and polymorphic auth tokens (for single sign on (SSOn) to a virtual delivery appliance 253) also become tied to the SC. In some embodiments, the smart card 202 and a personal identification number (PIN) may be a prerequisite to use CLs, LL AuthT, and PAuthT.

On a new kiosk computing device 201, retrieval of CLs may be expedited since the user device specific CLs bound to the SCs 202 are ready for immediate sync from SC storage 203. By way of contrast, the kiosk computing device 201 would otherwise need to request kiosk-device-bound CLs from the Cloud computing service 255 and asynchronous CL generation and synch, which may take significant time, especially if CLIS 258 or the Cloud broker 260 are fully loaded in terms of the volume of requests they are handling. In the example of FIG. 8, the CLIS 258 illustratively includes a respective user virtual folder 269 for registered users for storing key and published resource data, etc.

User-specific CLs are stored as part of a user wallet on the SC 202. These CLs are bound to the SC private/public key pair, as discussed further above. In some embodiments, user-specific CLs may also be stored in an optional local file storage 273 (shown in FIG. 9) in respective stores 274 so that they remain on the kiosk computing device 201, which is possible since they are already protected by the CWA 272. CWA 272 on the kiosk computing device 201 may download CLs and UI caches for users in the background (with or without the SCs 202 connected), and synchronize the CLS and UI caches when the smart cards are connected with the kiosk computing device. CWA 272 may also prioritize downloading CLs for users that are expected to use certain kiosk computing devices 201 more frequently or based on usage history or explicit assignment (within an area, hospital floor, etc.). This may be helpful with cases of limited SC 202 storage availability as well. The CWA app 272 illustratively includes a PWA and in-app caching module 282, a Self-Service Plugin (SSP) 283 which may perform calls home to the CLIS 258, a common connection manager 284, a CL synch engine 285 which communicates with the CLIS 258, and an HDX engine 286 for communicating with gateways 263 and/or virtual resources (SaaS/DaaS servers, etc.).

Group-level CLs may be generated on per group of devices (e.g., a per delivery group basis). These CLs are bound to the kiosk computing device 201 private/public key pair, as similarly discussed above with respect to the user CLS, and may be stored in a key store 275. Signed public keys (e.g., for the gateway 263, virtual delivery appliance 253, etc.) may be stored in a key store 276, and the group level CLs and UI caches may be stored in the memory or cache 273. Having the group CLs remain on the kiosk computing device 201 helps optimize CL generation, in that this portion of the connection lease does not have to be re-created with each individual CL, and facilitate CL sharing between users.

Shared component level CLs may also be used for common parameters, resource locations, etc. These CLs may be bound to either users or devices. Security may be applied via the resource CLs, and these shared component level CLs may be stored at one or more locations, including at the SCs 202, kiosk computing device 202, and local file share 280. More particularly, the local file share 280 may be used to store some or all of the user, group level and shared component level CLs in stores 281. CWA 272 on kiosk computing devices 201 may sync CLs and upload them to the local file share 280 if not already there (see FIG. 8). The local file share 280 may have a dedicated sync service to sync all CLs from the Cloud computing service 255. This does not pose a security risk because user specific and group level CLs are already bound to the specific private/public key pairs, as described above. In an optional implementation, for privacy protection and to prevent denial of service (DOS) attacks, an authentication mechanism may be added to the local file share 280 so that users may only see the user specific and group level CLs they are entitled to utilize.

As noted above, the signed public keys are signed by the RoT 257. The signed endpoint public key is stored on the SC 202 and/or the kiosk computing device 201 depending on the source of the private/public key pair, respectively. A signed CLIS 258 public key and the RoT 257 public key are stored on both the SC 202 and the kiosk computing device 201. Signed public keys are stored in protected key stores 271, 276, e.g., Data Protection (DP) API or Key Chain for the kiosk computing device 201. However, signed public keys are not stored on the local file share 280 in the illustrated example.

With respect to the UI resource caches, the user UI cache is stored on the SC 202 in order to allow users to load CWA 272 with a visual representation of UI assets. By way of example, such assets may include: static assets—app code (JS, HTML, CSS, images); and dynamic assets—resources (apps, desktops) the user is entitled to access. This may be practically achieved leveraging custom UI interception and caching techniques (e.g., based on the Axios library by Google), as opposed to simply relying on PWA Service Workers.

User specific versus group level UI resource cache may follow the same rules as user specific versus group level CLs. More particularly, user specific UI cache may be stored on the SC 202, and as an optimization may also be stored on the kiosk computing device 201 and the local file share 280. Group level UI cache may be stored on the kiosk computing device 201 and/or local file share 280 and, if the SC has extra storage, also on the SC 201.

The UI implementation on CWA 272 has the ability to distinguish between static (app code) and dynamic (apps, desktops) assets, resources that are leasable, etc. In-app caching may be extended to also keep track of the type of published resource (user vs. group level) and cache the assets at different locations as prescribed above. Loading of the assets from cache by the CWA instance 272 UI will query all available locations, including the SC 202, local browser cache (Document Object Model (DOM) storage) on the kiosk computing device 201, local file share 280 (after auth), and will merge the results. Assuming the kiosk computing devices 201 can persist the UI cache, then PWA and Service Workers can be configured to cache static assets. Yet, if the kiosk computing devices 201 are stateless or can lose the cache after reboot, etc., then in app-caching can be used for the static assets too. Similar to the group-level UI cache, the static assets can be stored on the kiosk computing device 201 and/or local file share 280 and, if the SC 202 has extra storage, also on the SC.

Further background on PWA and in-app caching is now provided. In typical implementations, UI caching can be achieved via PWA Service Workers. Normal PWA caching does not distinguish between static and dynamic assets, and it is not aware of the granularity of different Workspace feeds, for example: CVAD from Cloud, CVAD from on-prem site, Citrix Files (ShareFile), SaaS apps with Gateway auth requirement, SaaS apps without Gateway auth, on-prem Broker, CEM native apps, etc. However, PWA and Service Workers can be configured to cache static assets, and more particularly app code (JS, HTML, CSS, images). Service Workers are configured to network-first-fallback-to-cache caching strategy, because it is desirable to always load the latest version of the app as opposed to, e.g., load a previous stale app version from cache.

In one PWA implementation, custom in-app caching is performed for all dynamic assets, e.g., all the resources (apps, desktops) the user is entitled to. A cache-first-fall-back-to-network or cache-network-race caching strategy is used for performance reasons. There are multiple advantages of the in-app caching approach as opposed to PWA Service Workers. One of these advantages is that it can be extended to new caching strategies. In other words, treat the cache as an app cache, not as a URL cache. Thus, a new caching algorithm can be created depending on requirements. Other advantages may include direct control over cache coherence, optimized connect time based on resource cache status, and multi-feed awareness.

In an example embodiment, a WorxBox library can be used to implement Service Workers and caching. An Axios library can be used to communicate to the WorxBox by virtue of the requests in makes. The Axios library is effectively an interceptor for HTTP/HTTPS requests, and can be used to implement in-app caching. As already discussed above, the cache can be extended to understand different locations of assets, including SC 202, local browser cache (DOM storage) on the kiosk computing device 201, and local file share 280 (after auth).

Long-lived Auth Tokens (LL AuthT) are used for front-end authentication, resource enumeration, CL request and sync, etc. Polymorphic Auth Tokens (PAuthT) of different types are used for SSOn to virtual delivery appliances 253. In the context of the system 200, similar to user-specific and group-level CLs, user-specific LL AuthTs can be stored as part of the user wallet on the SC and are bound to the SC 202 private/public key pair. Moreover, group-level LL AuthTs can be generated per delivery group and are bound to the kiosk computing device 201 private/public key pair. They stay on the kiosk computing device 201 to optimize front-end authentication and related flows (resource enumeration, CL request and sync, etc.) at the group level. PAuthTs remain user-specific only, are stored as part of the user wallet on the SC 202 and are bound to the SC private/public key pair.

In an example embodiment, group-level CLs for common apps may be used in conjunction with user-specific CLs. This implies that group-level CL generation and consumption uses the kiosk computing device 201 private/public key pair, while the user-specific CL generation and consumption uses the SC 202 private/public key pair. A virtual SC 202 may be provided by a mobile device, e.g., a phone, wearable device such as a smart watch, etc., as long as there is a secure communication between the mobile device and the kiosk computing device 201. Security may be achieved via MDM, Bluetooth with pairing, NFC or other forms of securely bootstrapped communication, for example.

In one example implementation, to securely bootstrap the mobile device with a kiosk computing device 201, the CWA instance 272 on the kiosk computing device 201 may prompt the user to unlock and pair his or her mobile device. Upon unlocking the mobile device, a second CWA instance on the mobile device may establish a secure communication channel with the first CWA instance 272 on the kiosk computing device 201. For example, one or more of Bluetooth, NFC, WiFi, QR Code, etc., may be used. To further secure the communication, Transport Layer Security (TLS) may be used over Bluetooth or WiFi. Certificates pinned at the first CWA 272 and second CWA may be used for client and server certificate authentication with TLS. Note that the user wallet may also be used with the user's personal devices, e.g. desktop, laptop, etc., and not just kiosk computing devices 201.

With respect to storing arbitrary files on a smart card, this may be done with a Software Development Kit (SDK) that can be smart card vendor dependent or vendor independent. One example is OpenSC, which is compatible with a large number of SC providers. A challenge with smart card file storage is the relatively low (persistent) memory capacity of typical smart cards in general. The typical maximum used to be around a relatively small value of 256 KB of persistent storage, but even that it is sufficient for storing connection leases. However, persistent storage size continues to improve, and some providers now have non-volatile storage in the 1 MB to 2 MB range. The SC hardware also supports both NFC and USB.

If storage on the SC 202 is limited, CLs may be stored on the SC in priority order, e.g., starting with favorites and mandatory (business critical) apps. The UI cache may be heavy with icons, in which case only the app metadata, including name and description, could be stored on the SC 202 to conserve memory. In this regard, the CWA instance 272 could be present just a silhouette or a default icon, for example.

Figure 10:
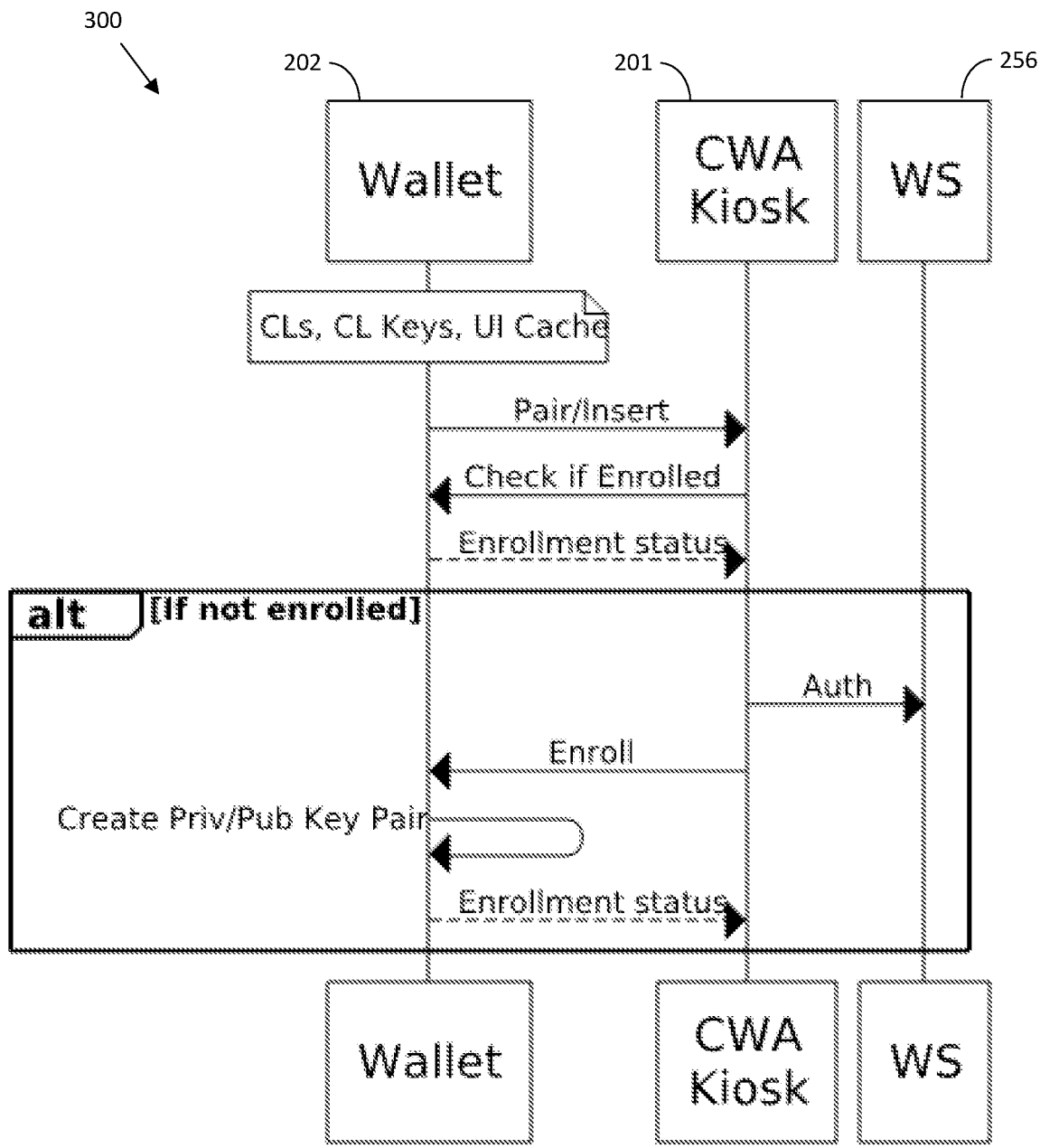
FIG. 10 is a sequence diagram illustrating a smart card (wallet) enrollment sequence which may be used with the system of FIG. 9.

Additional operational details are now provided with reference to the sequence flow diagrams 10-13B. A smart card (wallet) 202 enrollment sequence is first described with reference to the flow diagram 300 of FIG. 10. As discussed above, the wallet 202 stores user CLs, signed public keys, and user UI caches. Upon pairing with the kiosk computing device 201, the kiosk checks to see if the wallet 202 has been previously enrolled. If it has not, the kiosk computing device 201 requests authorization from Workspace (e.g., via a StoreFront) 256, and then enrolls the wallet 202. The wallet 202 then creates its private/public key pair, and confirms its enrollment status back to the kiosk computing device 201.

Figure 11:
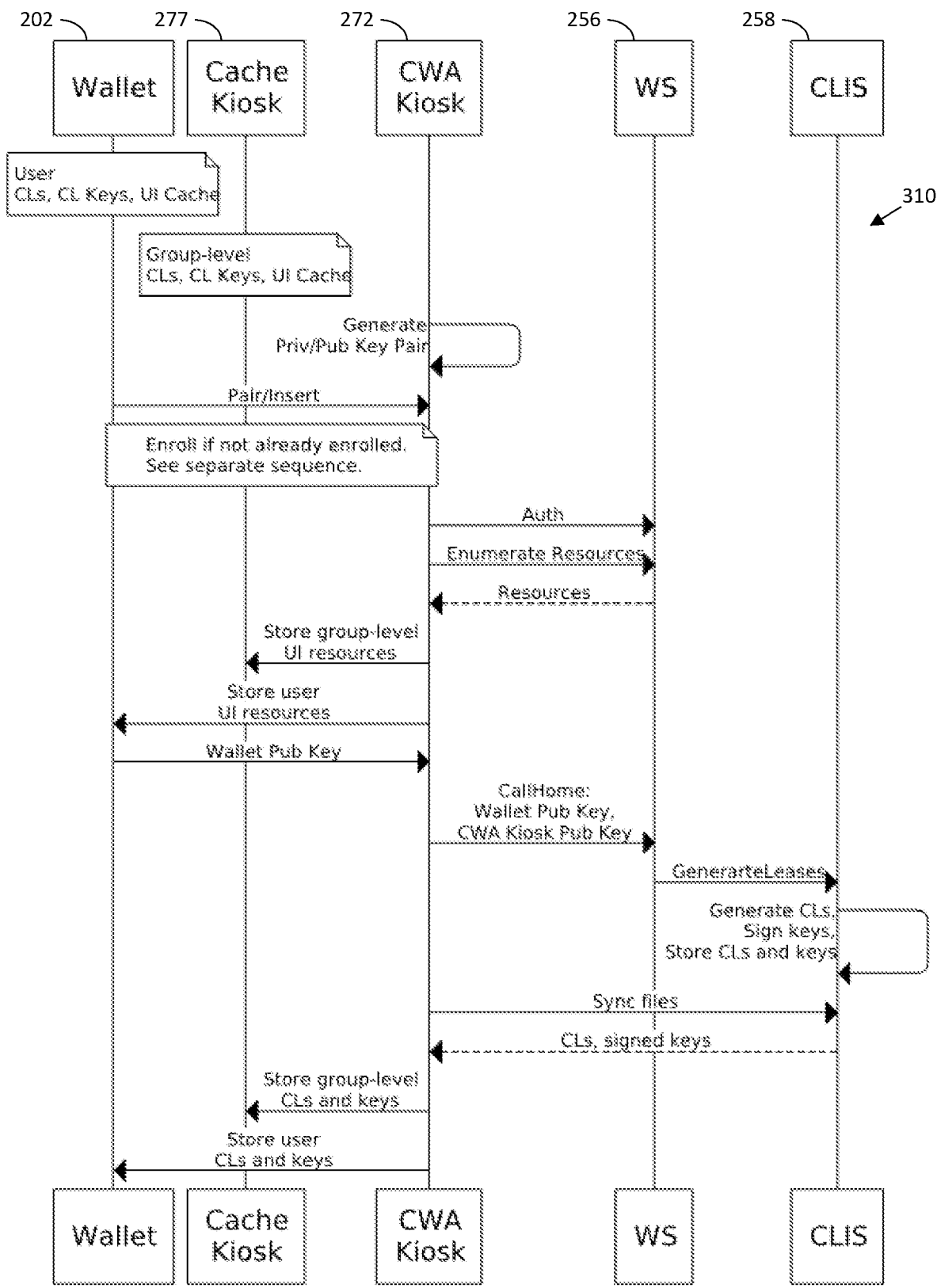
FIG. 11 is a sequence diagram illustrating an example wallet update sequence which may be used with the system of FIG. 9.

An example wallet update sequence is illustrated in the sequence diagram 310 of FIG. 11. The user CLs, CL keys, and UI cache are stored at the wallet 202, while the group-level CLs, CL keys, and UI caches are stored at the kiosk computing device 201 as discussed above. The CWA instance 272 at the kiosk computing device 201 generates a private/public key pair. The wallet 202 pairs or is otherwise connected with the kiosk computing device 201, and if the wallet is not already enrolled then the process described above with respect to FIG. 10 would be performed. The CWA instance 272 sends authorization and resource enumeration requests to Workspace 256, which enumerates the resources for the CWA instance. The CWA instance 272 may then store the group-level UI resources in the kiosk cache 277, and store or download the user UI resources at the wallet 202. The wallet 202 provides its public key to the CWA instance 272, and the CWA instance calls home to Workspace 256 using the wallet public key and the kiosk computing device 201 public key. Workspace 256 then sends a generate lease request to the CLIS 258, which generates the requested CLs and signs keys, and stores the connection leases and signed keys as discussed further above. The CWA instance 272 and CLIS 258 may then synch the CLs and signed keys to the kiosk computing device 201. The group-level CLs and keys may be stored in the kiosk cache 277 while the user CLs and keys are stored at the wallet 202.

Figure 12:
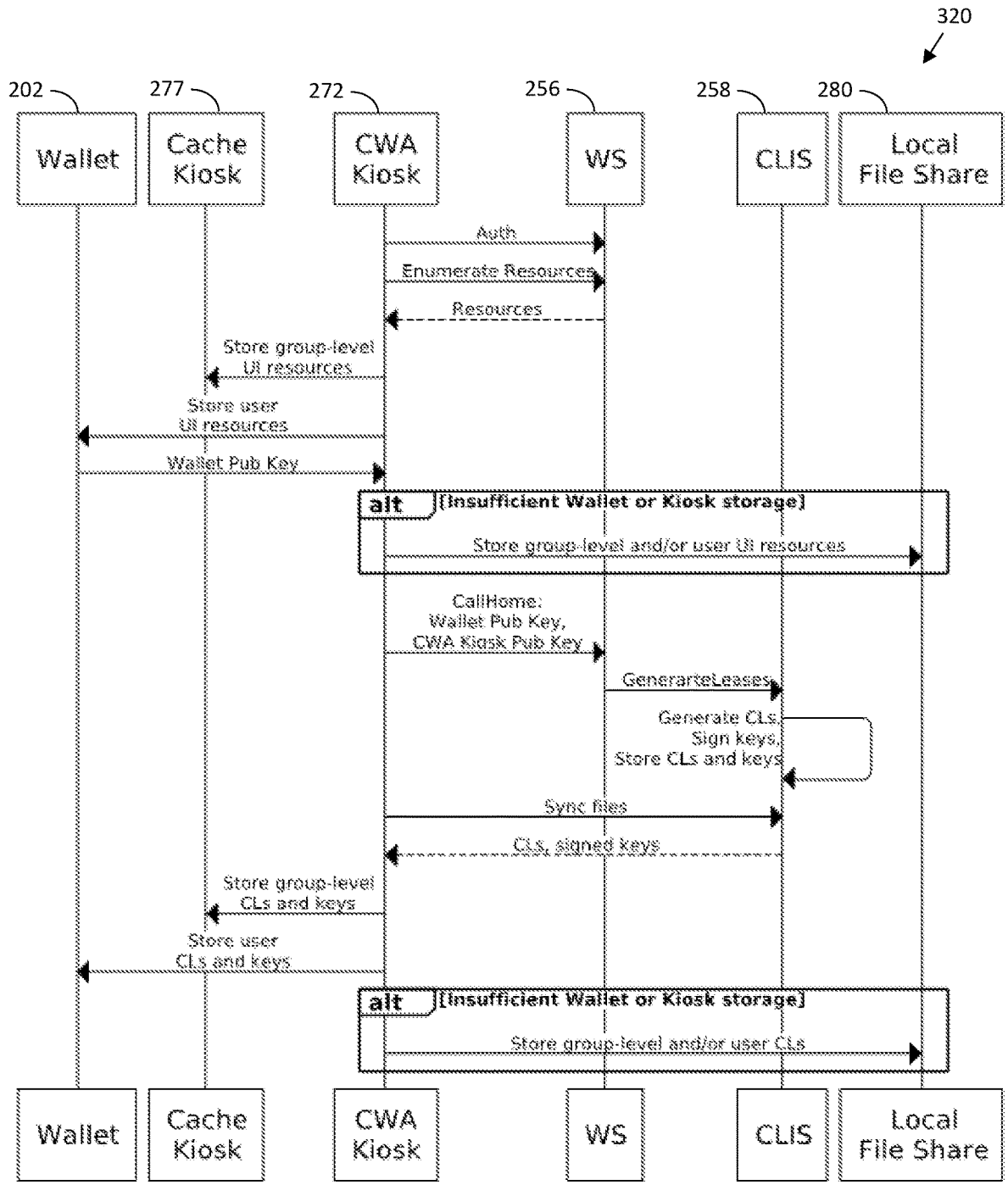
FIG. 12 is a sequence diagram illustrating an example approach for the storage of user and group-level user interface (UI) resource cache and connection leases on a local file share in the system of FIG. 9.

An example approach for the storage of user and group-level UI resource cache and CLs on the local file share 280 is illustrated in the sequence diagram 320 of FIG. 12. The CWA instance 272 sends authorization and resource enumeration requests to workspace 256, which returns the enumerated resources. Group-level UI resources are stored in the kiosk cache 277 while the user UI resources are stored at the wallet 202. The wallet 202 provides it public key to the CWA instance 272, and if there is insufficient wallet or kiosk storage then the wallet public key is stored at the local file share 280. The CWA instance 272 calls to workspace 256 using the wallet public key and the kiosk computing device

201 public key. Workspace 256 requests lease generation from CLIS 258, which generates the requested CLs and signs keys, and stores the connection leases and signed keys as discussed further above. The CWA instance 272 and CLIS 258 may then sync the CLs and signed keys to the kiosk computing device. The group-level CLs and keys may be stored in the kiosk cache 277, while the user CLs and keys are stored at the wallet 202.

Figure 13A:
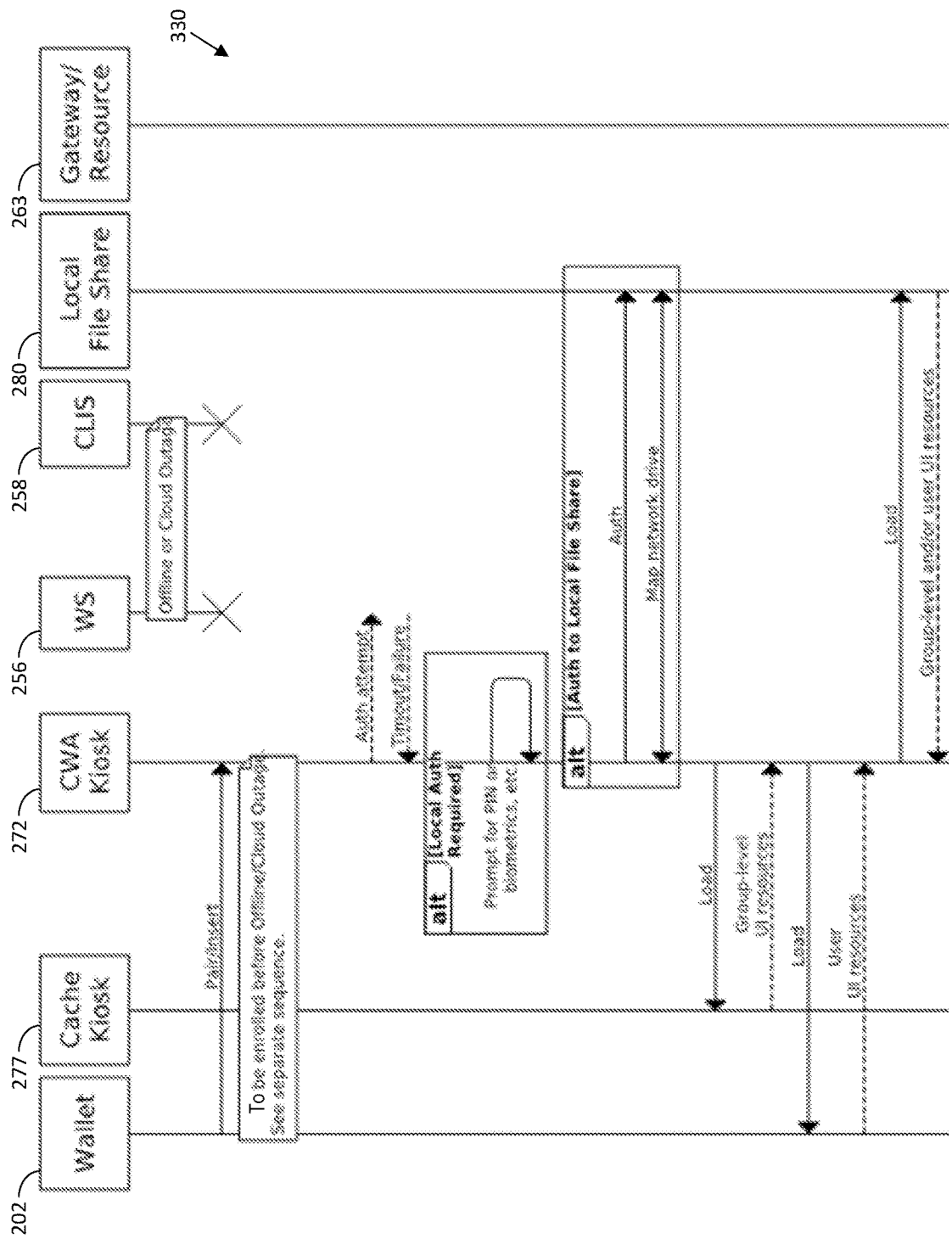
FIGS. 13A and 13B are a sequence diagram illustrating an example approach for launching virtual sessions during offline or cloud outage conditions with the system of FIG. 9.
Figure 13B:
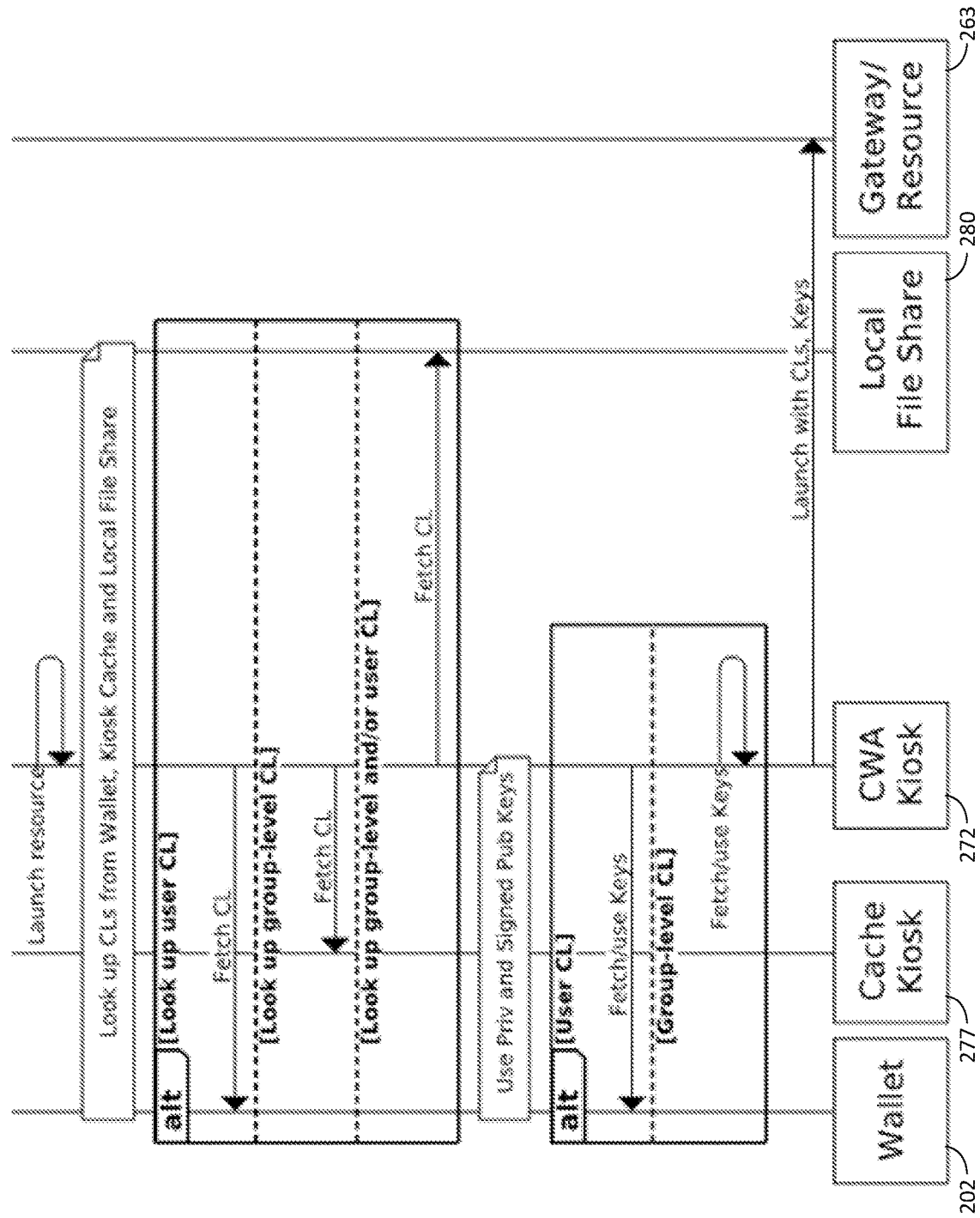

An example approach for launching during offline or cloud outage conditions (e.g., when workspace 256 and CLIS 258 are unavailable) is illustrated in the sequence diagram 330 of FIGS. 13A-13B. This approach uses different types of UI resource cache and CLs from the wallet 202 and optional kiosk local storage 273 and local file share 280, as well as different types of private keys and signed public keys (depending on the type of CL) to perform a secure, trusted CL exchange. For this example, it is assumed that the wallet 202 has already been enrolled as described above. Upon pairing or connection of the wallet 202 with the CWA instance 272, the CWA instance 272 will attempt an authorization request with workspace 256, which will timeout and fail due to workspace being offline, Cloud outage, etc. As such, the CWA instance 272 will perform a local authorization by prompting the user of the wallet 202 for a PIN or biometric identifier, and then send an auth request to the local file share 280 and a mapping of the local file share 280 as a network drive. The CWA instance 272 causes the kiosk cache 277 and wallet 202 to provide the group-level and user UI resources, respectively, and/or may cause the local file share 280 to provide group-level/user UI resources as well.

The CWA instance 272 may then launch the requested resource using the appropriate CLs from the wallet 202, kiosk cache 277 and local file share 280. In some implementations, lookups may be performed for the user CLs, group-level CLs, and/or keys by sending fetch requests from the CWA instance 272 to one or more of the wallet 202, kiosk cache 277, and local file share 280. The CWA instance 272 may then launch the virtual session via the gateway 263 using the CLs and keys.

Figure 14:
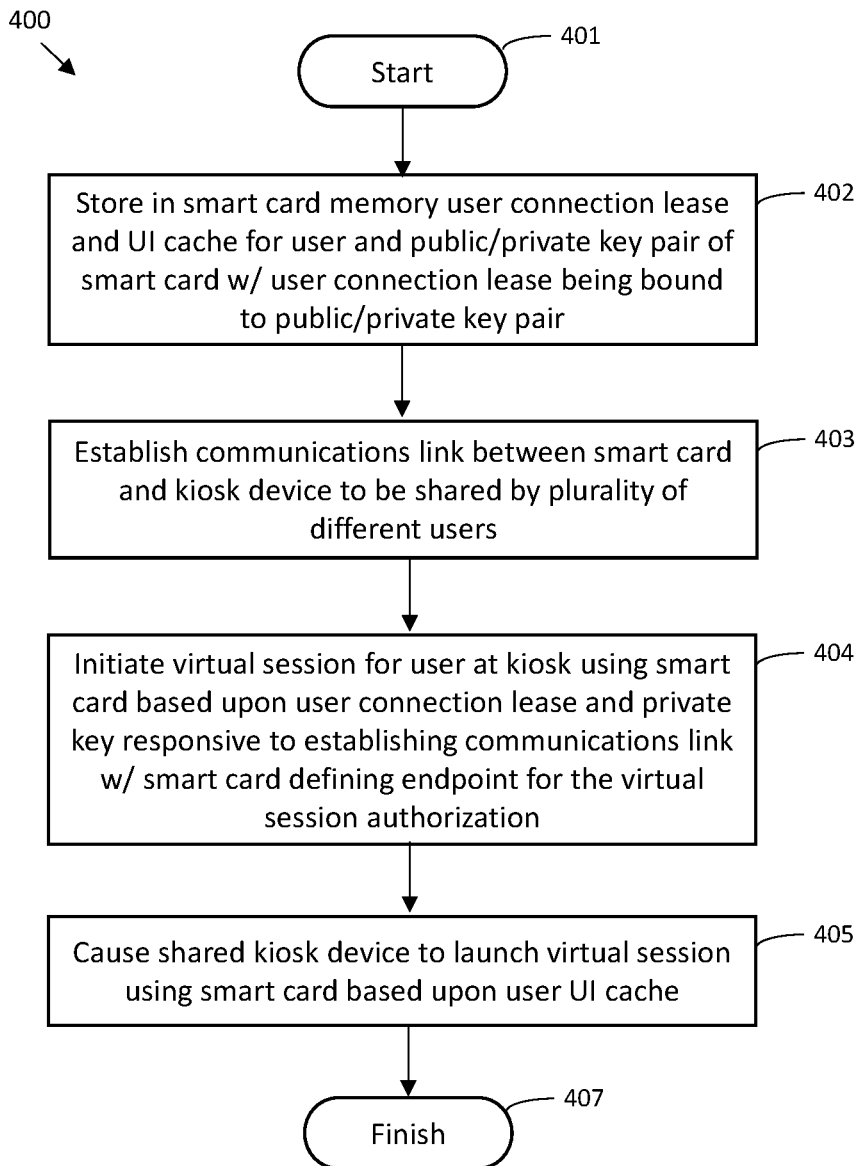
FIGS. 14 and 15 are flow diagrams illustrating method aspects associated with the system of FIG. 6.

Turning now to the flow diagram 400 of FIG. 14, a related method for using a smart card 202 is now described. Beginning at Block 401, a user connection lease and UI cache for a user and a private/public key pair of the smart card are stored in the memory 203 of the smart card 202, at Block 402. As discussed above, the user connection lease is bound to the private/public key pair of the smart card 202. The method further illustratively includes establishing a communications link between the smart card 202 and a kiosk device 201, at Block 403, with the kiosk device to be shared by a plurality of different users. The method also illustratively includes initiating a virtual session for the user at the kiosk device 201 using the smart card 202 based upon the user connection lease and the private key responsive to establishing the communications link, at Block 404, with the smart card defining an endpoint for the virtual session authorization. The method further illustratively includes causing the shared kiosk device 201 to launch the virtual session using the smart card 202 based upon the user UI cache, at Block 405, which illustratively concludes the method of FIG. 14 (Block 407).

Figure 15:
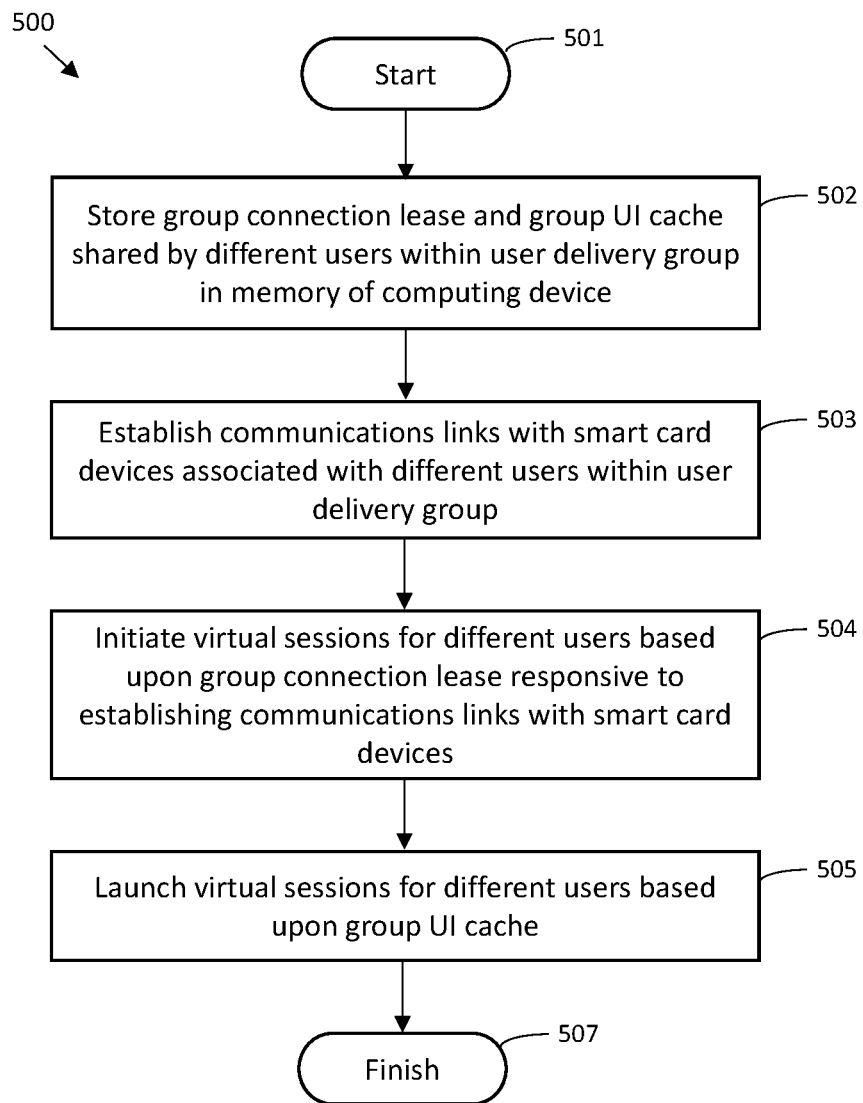

A related method for launching a virtual session from the kiosk computing device 201 is now described with reference to the flow diagram 500 of FIG. 15. Beginning at Block 501, a group connection lease and a group UI cache shared by different users within a user delivery group are stored in the memory 205 of the computing device (e.g., kiosk computing device 201), at Block 502. The method may also include using a processor 206 of the kiosk computing device 201 to establish communications links with the smart card devices 202 which are associated with different users within the user delivery group, at Block 503, and initiate virtual sessions for the different users based upon the group connection lease responsive to establishing the communications links with the smart card devices, at Block 504. The method further illustratively includes launching the virtual sessions for the different users based upon the group UI cache, at Block 505, which illustratively concludes the method of FIG. 15 (Block 507).

Various use cases and optional alternatives of the above described have been described above, e.g., physical versus virtual smart cards, local file share 280, etc. Other example implementations may incorporate HTML5 CWA (pure browser case), which may apply the above described concepts by redirecting UI resource cache and CLs to the smart card 202. In a managed scenario were the app code (e.g., JavaScript) in the browser may have restricted access to the smart card 202, controlled and managed hooks (browser extensions, browser helper objects or other hooks) can be used to redirect outside of the browser. Managed hooks may be used in a managed environment where the browser (as opposed to native CWA) may be preferred for user experience (UX). Furthermore, it should be noted that the concepts described above may also be applied to different CL use cases, e.g., for Web/SaaS apps, Cloud file storage, Customer Experience Management (CEM) native apps, etc.

Additional optimizations are also possible. For example, frequently used group-level or shared component-level CLs can also be stored on the smart card 202 to avoid the need to sync. For example, a group-level private/public key pair may be generated at an enrollment station and stored in the smart card 202. In accordance with another example, the smart card may have both a group-level and a user-specific private/public key pair.

FURTHER EXAMPLE EMBODIMENTS

The following examples are further example embodiments, from which other permutations and configurations will be apparent to the skilled artisan.

Example A is for a computing device comprising: a memory configured to store a group connection lease and a group user interface (UI) cache shared by different users within a user delivery group; and a processor coupled to the memory and configured to establish communications links with a plurality of smart card devices associated with different users within the user delivery group, initiate virtual sessions for the different users based upon the group connection lease responsive to establishing the communications links with the smart card devices, and launch the virtual sessions for the different users based upon the group UI cache.

Example B includes the subject matter of Example A, wherein wherein the smart card devices are configured to store individual connection leases and individual UI caches; wherein the processor is configured to initiate the virtual sessions also based upon the individual connection leases and individual UI caches; and wherein the processor is configured to perform a background download of updates to the individual connection leases and individual UI caches to the memory, and provide the updates from the memory to the smart card devices upon establishing communications links therewith.

Example C includes the subject matter of Example B wherein the processor is further configured to prioritize the background downloading based upon a usage history of the smart card devices.

Example D includes the subject matter of Example B wherein the processor is further configured to synchronize the individual connection leases and the group connection lease with a connection lease issuing service (CLIS).

Example E includes the subject matter of Example A wherein the smart card devices are configured to store individual connection leases and individual UI caches; wherein the processor is configured to initiate the virtual sessions also based upon the individual connection leases and individual UI caches; and wherein the processor is configured to perform a background download of updates to the individual connection leases and individual UI caches to a local file share, and provide the updates from the local file share to the smart card devices upon establishing communications links therewith.

Example F includes the subject matter of Example A wherein processor is configured to launch the virtual sessions within a browser and store data from the virtual sessions in a non-persistent location in the memory while the browser is open, and wherein the processor is configured to separately store the group connection lease and group UI cache in a persistent location in the memory that is available when the browser is closed.

Example G includes the subject matter of Example A wherein the memory is further configured to store at least one authentication (auth) token, and wherein the processor is configured to initiate the virtual sessions using single sign-on (SSon) authentication based upon the at least one auth token.

Example H includes the subject matter of Example A wherein the group UI cache comprises at least one static asset to be displayed by the processor on a display.

Example I includes the subject matter of Example A wherein the group UI cache comprises at least one published resource users within the user delivery group are entitled to access through the virtual sessions.

Example J includes the subject matter of Example A wherein the communications links comprise at least one of a near field communication (NFC) link, a universal serial bus (USB) link, a Bluetooth link, and a wireless local area network (WLAN) link.

Example K is for a method comprising: storing a group connection lease and a group user interface (UI) cache shared by different users within a user delivery group in a memory of a computing device; and using a processor of the computing device to establish communications links with a plurality of smart card devices associated with different users within the user delivery group, initiate virtual sessions for the different users based upon the group connection lease responsive to establishing the communications links with the smart card devices, and launch the virtual sessions for the different users based upon the group UI cache.

Example L includes the subject matter of Example K wherein the smart card devices are configured to store individual connection leases and individual UI caches; wherein the processor is configured to initiate the virtual sessions also based upon the individual connection leases and individual UI caches; and further comprising using the processor to perform a background download of updates to the individual connection leases and individual UI caches to the memory, and provide the updates from the memory to the smart card devices upon establishing communications links therewith.

Example M includes the subject matter of Example L further comprising using the processor to prioritize the background downloading based upon a usage history of the smart card devices.

Example N includes the subject matter of Example L further comprising using the processor to synchronize the individual connection leases and the group connection lease with a connection lease issuing service (CLIS).

Example O includes the subject matter of Example K wherein the smart card devices are configured to store individual connection leases and individual UI caches; wherein the processor is configured to initiate the virtual sessions also based upon the individual connection leases and individual UI caches; and further comprising using the processor to perform a background download of updates to the individual connection leases and individual UI caches to a local file share, and provide the updates from the local file share to the smart card devices upon establishing communications links therewith.

Example P includes the subject matter of Example K wherein the processor is configured to launch the virtual sessions within a browser and store data from the virtual sessions in a non-persistent location in the memory while the browser is open, and further comprising using the processor to separately store the group connection lease and group UI cache in a persistent location in the memory that is available when the browser is closed.

Example Q includes the subject matter of Example K further comprising using the processor to store at least one authentication (auth) token in the memory, and wherein the processor is configured to initiate the virtual sessions using single sign-on (SSon) authentication based upon the at least one auth token.

Example R includes the subject matter of Example K wherein the group UI cache comprises at least one of a static asset to be displayed by the processor on a display and a published resource users within the user delivery group are entitled to access through the virtual sessions.

Example S is for a non-transitory computer-readable medium having computer-executable instructions for causing a processor of a computing device to perform steps comprising: storing a group connection lease and a group user interface (UI) cache shared by different users within a user delivery group in a memory; establishing communications links with a plurality of smart card devices associated with different users within the user delivery group; initiating virtual sessions for the different users based upon the group connection lease responsive to establishing the communications links with the smart card devices; and launching the virtual sessions for the different users based upon the group UI cache.

Example T includes the subject matter of Example S wherein the smart card devices are configured to store individual connection leases and individual UI caches; wherein initiating comprises initiating the virtual sessions also based upon the individual connection leases and individual UI caches; and further having computer-executable instructions for causing the processor to perform background downloading of updates to the individual connection leases and individual UI caches to the memory, and provide the updates from the memory to the smart card devices upon establishing communications links therewith.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A smart card comprising:
a memory configured to store a user connection lease and user interface (UI) cache for a user and a private/public key pair of the smart card, the user connection lease being bound to the private/public key pair of the smart card; and
a processor coupled to the memory and configured to
establish a communications link with a kiosk device to be shared by a plurality of different users,
initiate a virtual session for the user at the kiosk device based upon the user connection lease and the private key responsive to establishing the communications link, the smart card defining an endpoint for the virtual session authorization, and
cause the kiosk device to launch the virtual session based upon the user UI cache.

2. The smart card of claim 1 wherein updates to the user connection lease and UI cache are stored at the kiosk device, and wherein the processor is configured to download the updates to the user connection lease and UI cache from the kiosk device to the memory upon establishing the communications link with the kiosk device.

3. The smart card of claim 1 wherein the memory is further configured to store an authentication (auth) token, and wherein the processor is configured to initiate the virtual session using single sign-on (SSon) authentication based upon the auth token.

4. The smart card of claim 1 wherein the memory is configured to store a version of the public encryption key signed by a Root of Trust (RoT), and wherein the processor is further configured to cause the kiosk device to initiate updates to the user connection lease by a connection lease issuing service (CLIS) and to initiate the virtual session for the user at the kiosk device based upon the public encryption key signed by the RoT.

5. The smart card of claim 4 wherein the memory is further configured to store a public encryption key of the CLIS signed by the RoT and a public encryption key of the RoT, and wherein the processor is further configured to initiate the virtual session by performing a user connection lease exchange with a virtual delivery appliance configured to deliver the virtual session based upon the signed CLIS public key and the RoT public key.

6. The smart card of claim 1 wherein the UI cache comprises at least one static asset to be displayed by the kiosk device.

7. The smart card of claim 1 wherein the UI cache comprises at least one published resource the user is entitled to access through the virtual session.

8. The smart card of claim 1 wherein the communications link comprises at least one of a near field communication (NFC) link, a universal serial bus (USB) link, a Bluetooth link, and a wireless local area network (WLAN) link.

9. An electronic device comprising:
a portable housing;
a memory in the portable housing configured to store a virtual smart card, a private/public key pair of the virtual smart card, and a user connection lease and user interface (UI) cache for a user, the user connection lease being bound to the private/public key pair of the virtual smart card; and
a processor in the portable housing coupled to the memory and configured to
establish a communications link with a kiosk device to be shared by a plurality of different users,
initiate a virtual session for the user at the kiosk device based upon the user connection lease and the private key responsive to establishing the communications link, the virtual smart card defining an endpoint for the virtual session authorization, and
cause the kiosk device to launch the virtual session based upon the user UI cache.

10. The electronic device of claim 9 wherein updates to the user connection lease and UI cache are stored at the kiosk device, and wherein the processor is configured to download the updates to the user connection lease and UI cache from the kiosk device to the memory upon establishing the communications link with the kiosk device.

11. The electronic device of claim 9 wherein the memory is further configured to store an authentication (auth) token, and wherein the processor is configured to initiate the virtual session using single sign-on (SSon) authentication based upon the auth token.

12. The electronic device of claim 9 wherein the memory is configured to store a version of the public encryption key signed by a Root of Trust (RoT), and wherein the processor is further configured to cause the kiosk device to initiate updates to the user connection lease by a connection lease issuing service (CLIS) and to initiate the virtual session for the user at the kiosk device based upon the public encryption key signed by the RoT.

13. The electronic device of claim 12 wherein the memory is further configured to store a public encryption key of the CLIS signed by the RoT and a public encryption key of the RoT, and wherein the processor is further configured to initiate the virtual session by performing a user connection lease exchange with a virtual delivery appliance configured to deliver the virtual session based upon the signed CLIS public key and the RoT public key.

14. The electronic device of claim 9 wherein the portable housing comprises at least one of a smartphone housing and a smart watch housing.

15. A method comprising:
storing in a memory a user connection lease and user interface (UI) cache for a user and a private/public key pair of a smart card, the user connection lease being bound to the private/public key pair of the smart card;
establishing a communications link between the smart card and a kiosk device, the kiosk device to be shared by a plurality of different users;
initiating a virtual session for the user at the kiosk device using the smart card based upon the user connection lease and the private key responsive to establishing the communications link, the smart card defining an endpoint for the virtual session authorization; and causing the kiosk device to launch the virtual session using the smart card based upon the user UI cache.

16. The method of claim 15 wherein updates to the user connection lease and UI cache are stored at the kiosk device; and further comprising downloading the updates to the user connection lease and UI cache from the kiosk device to the memory upon establishing the communications link with the kiosk device.

17. The method of claim 15 further comprising storing an authentication (auth) token in the memory; and wherein initiating the virtual session comprises initiating the virtual session using single sign-on (SSon) authentication based upon the auth token.

18. The method of claim 15 further comprising storing a version of the public encryption key signed by a Root of Trust (RoT) in the memory; and further comprising using the smart card to cause the kiosk device to initiate updates to the user connection lease by a connection lease issuing service (CLIS), and to initiate the virtual session for the user at the kiosk device based upon the public encryption key signed by the RoT.

19. The method of claim 18 further comprising storing a public encryption key of the CLIS signed by the RoT and a public encryption key of the RoT in the memory; and further comprising using the smart card to initiate the virtual session by performing a user connection lease exchange with a virtual delivery appliance configured to deliver the virtual session based upon the signed CLIS public key and the RoT public key.

20. The method of claim 15 wherein the UI cache comprises at least one of a static asset to be displayed by the kiosk device, and a published resource the user is entitled to access through the virtual session.

* * * * *